United States Patent [19]
Owaki et al.

[11] Patent Number: 6,009,523
[45] Date of Patent: *Dec. 28, 1999

[54] INFORMATION PROCESSING APPARATUS WITH SECURITY CHECKING FUNCTION

[75] Inventors: Hidetaka Owaki; Takeshi Nagashima; Yukitoshi Kageyama, all of Tokyo, Japan

[73] Assignee: Sega Enterprises, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,996

[22] PCT Filed: Feb. 7, 1996

[86] PCT No.: PCT/JP96/00251

§ 371 Date: Aug. 27, 1996

§ 102(e) Date: Aug. 27, 1996

[87] PCT Pub. No.: WO96/24894

PCT Pub. Date: Aug. 15, 1996

[30] Foreign Application Priority Data

Feb. 8, 1995 [JP] Japan ................................... 7-20132

[51] Int. Cl.⁶ .................................................. G06F 12/14
[52] U.S. Cl. ........................................................ 713/200
[58] Field of Search ........................... 395/186, 187.01, 395/188.01, 218; 380/3, 4, 25, 30

[56] References Cited

U.S. PATENT DOCUMENTS

| | | | |
|---|---|---|---|
| 4,433,207 | 2/1984 | Best | 178/22.09 |
| 4,442,486 | 4/1984 | Mayer | 364/200 |
| 4,454,594 | 6/1984 | Heffron et al. | 364/900 |
| 4,558,176 | 12/1985 | Arnold et al. | 178/22.08 |
| 4,621,321 | 11/1986 | Boebert et al. | 364/200 |
| 4,864,494 | 9/1989 | Kobus | 364/200 |
| 5,007,082 | 4/1991 | Cummins | 380/4 |
| 5,113,518 | 5/1992 | Durst et al. | 395/550 |
| 5,134,391 | 7/1992 | Okada | 340/799 |
| 5,155,829 | 10/1992 | Koo | 395/425 |
| 5,343,524 | 8/1994 | Mu et al. | 380/4 |
| 5,379,301 | 1/1995 | Sato et al. | 371/19 |
| 5,388,841 | 2/1995 | San et al. | 273/435 |
| 5,412,718 | 5/1995 | Narasimhalu et al. | 380/4 |
| 5,418,852 | 5/1995 | Itami et al. | 380/4 |
| 5,485,622 | 1/1996 | Yamaki | 395/186 |

FOREIGN PATENT DOCUMENTS

| | | |
|---|---|---|
| 47765/90 | 7/1990 | Australia . |
| 6-332731 | 2/1994 | Japan . |
| WO 94/20901 A1 | 9/1994 | WIPO . |

*Primary Examiner*—Robert W. Beausoliel, Jr.
*Assistant Examiner*—Pierre Eddy Elisca
*Attorney, Agent, or Firm*—Dickstein Shapiro Morin & Oshinsky LLP

[57] ABSTRACT

An information processing apparatus has a security checking function for ascertaining the authenticity of a program to be executed, and the program and display data to be displayed are stored in an external storage device. The information processing apparatus, which has a CPU for executing a program, is connected to the external storage device and a display device for displaying the display data. During the execution of the program, the display data stored in the external storage device are displayed on the display device in consonance with that program. The display data are compared with comparison reference data that are stored in the information processing apparatus. When the two sets of data do not match, the operation of the CPU of the information processing apparatus is halted, and further execution of the program is prevented.

37 Claims, 11 Drawing Sheets

INFORMATION PROCESSING APPARATUS WITH SECURITY CHECKING FUNCTION

BACKGROUND OF THE INVENTION

1. Field of the Invention

The present invention relates to a security checking method for ascertaining the authenticity of a program that is to be executed, to an information processing apparatus having such a security checking function, and to a program storage device that is employed for the information processing apparatus.

2. Related Arts

As the processing speed of microprocessors is being increased, information processing apparatuses of various types are being provided, and programs for execution by such information processing apparatuses are also being provided on many types of recording media.

Especially for information processing apparatuses, such as video game machines, the media employed for the distribution of game programs that are to be executed are usually cartridges, in which are packaged semiconductor read only memory (ROM) chips on which programs are recorded, or CD-ROMs.

In the video game business, not only is the superiority of a video game machine important, but also the relative excellence of a video game affects the distribution of game programs. If an excellent game program can be copied, or imitated, and sold by a third party who is not authorized to do so, the value to a developer of that game program is lost and the confidence of customers in the products of the developer is also deteriorated.

Therefore, security checking functions for examining the authenticity of programs and for preventing the execution of illegal programs have been proposed for information processing apparatuses, and have been implemented.

Such prior art techniques are described in, for example, U.S. Pat. No. 4,442,486 (hereinafter abbreviated as "USP486"), U.S. Pat. No. 4,454,594 (hereinafter abbreviated as "USP594), U.S. Pat. No. 4,462,076 (hereinafter abbreviated as "USP076"), and Japanese Unexamined Patent Publication No. Sho 62-3331 (hereinafter abbreviated as a "331 publication").

In the technique disclosed in USP486, a program includes data for generating a display signal to momentarily display a patent number or a patent application number. The authenticity of the program is ascertained by examining the data for the generation of the momentary display to determine whether they match a reference signal that is stored in an information processing apparatus.

The technique disclosed in USP594, which is the same as that in USP486, reads data that are stored in a specific location in an external memory in which a program is stored, displays the read data, such as a trademark, and determines whether or not the data match reference data that are stored in an information processing apparatus. When the data do not match, execution of the program is blocked.

The technique disclosed in USP076, which is the same as the techniques in USP486 and USP594, compares data at a predetermined address in an external memory cartridge with reference data stored in an information processing apparatus. Before substantially connecting the external memory to the apparatus, information concerning an authorized owner is displayed.

When the data matches the reference data, the external memory cartridge is regarded as an authentic one, and execution of a game is enabled.

Further, in the 331 publication, especially before a main operation of an information processing apparatus is begun, a program that is stored in an external memory device to ascertain program authenticity is executed by the external memory device. At the same time, a program for ascertaining program authenticity is executed by the information processing apparatus. When the results obtained by the execution of both programs for ascertaining program authenticity match, the main operation of the apparatus is activated.

The conventional security checking function for an information processing apparatus is performed by determining whether security codes, etc., match before a program, such as a game program, is executed. Once the execution of a program has begun, further security checking is not performed, or else can not be performed, for the duration of the execution of the program.

In a sequence of a program, therefore, steps for security checking processing are disabled or bypassed by some means, usually illegally, and as a result, the following steps in the program are performed though without the security check.

In addition, according to the security checking method described in USP486, USP596 or USP076, display data, such as a trademark, are merely displayed momentarily; the information processing apparatus neither checks to determine whether or not the correct image of a trademark, etc., is actually displayed, nor is it designed to do so.

Further, as is described above, when the steps for processing the security checking are disabled or bypassed in some manner, specific data can not be displayed and the authenticity of a program can not be examined.

SUMMARY OF THE INVENTION

It is therefore a first object of the present invention to provide an information processing apparatus that easily and securely confirms whether or not software (a program) that is to be executed by the information processing apparatus is an authentic program, and a method therefor.

It is a second object of the present invention to provide an information processing apparatus that can legally and securely prevent the manufacture and sale of illegal programs, and a method therefor.

It is a third object of the present invention to provide an information processing apparatus that assumes that displaying of display data using an image or sound is based on a program that is stored in an external storage device and that enables the display of a specific illegal, and a method therefor.

It is a fourth object of the present invention to provide an information processing apparatus that can prevent the execution of an illegal procedure that disables and bypasses the security checking that is intended to confirm program authenticity, and a method therefor.

It is a fifth object of the present invention to provide an information processing apparatus that, to more certainly achieve the fourth object, prevents the execution of an illegal procedure that replaces a program with an unauthentic (false) program during security checking, and to a method therefor.

It is a sixth object of the present invention to provide an external memory device that is adapted for the first through the fifth objects.

To achieve the first object, an information processing apparatus having a security checking function, which is to be connected detachably to an external memory means for storing a program and display data, and an output means for displaying data that are read from the external memory means, comprises:

a CPU for executing a program that is read from the external memory means;

internal memory means for storing comparison reference data; and security checking means for comparing the comparison reference data with the display data that are read from the external memory means.

Further, to achieve the first object, a security checking method comprises:

a first step of reading a program and display data from an external memory means in which the program and the display data are stored;

a second step of outputting a check start signal based on a display check start command included in the program read from the external memory means;

a third step of comparing the display data read from the external memory means with comparison reference data when a check start signal is output, and of generating an error signal when the display data do not match the comparison reference data; and a fourth step of, in response to the error signal, preventing execution of at least one part of the program.

With this arrangement, data that are output and displayed as a video image or sound are to be compared for a security check. Through this process, a counterfeit program can be prevented from being executed.

To achieve the second object, an information processing apparatus displays data on an output means to inhibit the use of a program by an unauthorized person.

To achieve the second object, a security checking method further comprises a fifth step of, when the display data match the comparison reference data at the third step, generating a control signal for displaying the display data, and of displaying the output data based on the control signal.

With the above described structure, when the display data is a trademark, etc., by the display of the dispaly data the use of a program by unauthorized persons can be inhibited, and the manufacture and sale of counterfeit programs can be legally inhibited.

To achieve the third object, an information processing apparatus comprises display data storage means for storing display data that are compared with the comparison reference data, and the display data are transferred from the external memory means to the display data storage means and are stored therein in accordance with a program that is stored in the external memory means.

To further achieve the third object, using a security checking method the dispaly data that are stored in the external memory means at the first step are read in consonance with the program.

With this arrangement, since the display data are transferred to and stored in the data storage means in consonance with a program that is stored in the external memory device, the display of the display data can be performed by a program that is stored in the external memory device, and what is illegal can be clarified.

To achieve the fourth object, in an information processing apparatus, the security checking means repeatedly compares the display data with the comparison reference data during an operation performed by the CPU.

To achieve the fourth object, using a security checking method comparison of the display data with the comparison reference data at the third step is repeatedly performed during the execution of the program.

With this arrangement, since the comparison for security checking is repeated throughout the operation of a program, an illegal act, such as bypassing security checking, can be prevented.

To achieve the fifth object, in an information processing apparatus, the display data are transferred from the external memory means to, and are stored in, the display data storage means before the security checking means performs a data comparison, and after the data comparison by the security checking means and the output and display of the data by the output means are completed, the data are erased from the display data storage means.

To achieve the fifth object, a security checking method further comprises a sixth step of, after the display data are displayed at the fifth step, erasing the display data.

With this structure, display data must be newly read for repeated comparison checks. Therefore, an illegal act by which a program is replaced with a counterfeit (unauthentic) program is prevented during the security checking process, and the fourth object can be achieved more certainly.

To achieve the sixth object, in an external memory device, which is detachably connected to an information processing apparatus, are stored a program to be executed by the information processing apparatus and display data to be displayed by the information processing apparatus, and the display data are read by the information processing apparatus in consonance with the program.

With the above structure, the external memory device can be adapted for the first through the fifth objects.

DETAILED DESCRIPTION OF THE PREFERRED EMBODIMENTS

The preferred embodiments of the present invention will now be described while referring to the accompanying drawings. The same reference numbers or symbols are used to denote corresponding or identical components.

Figure 1:
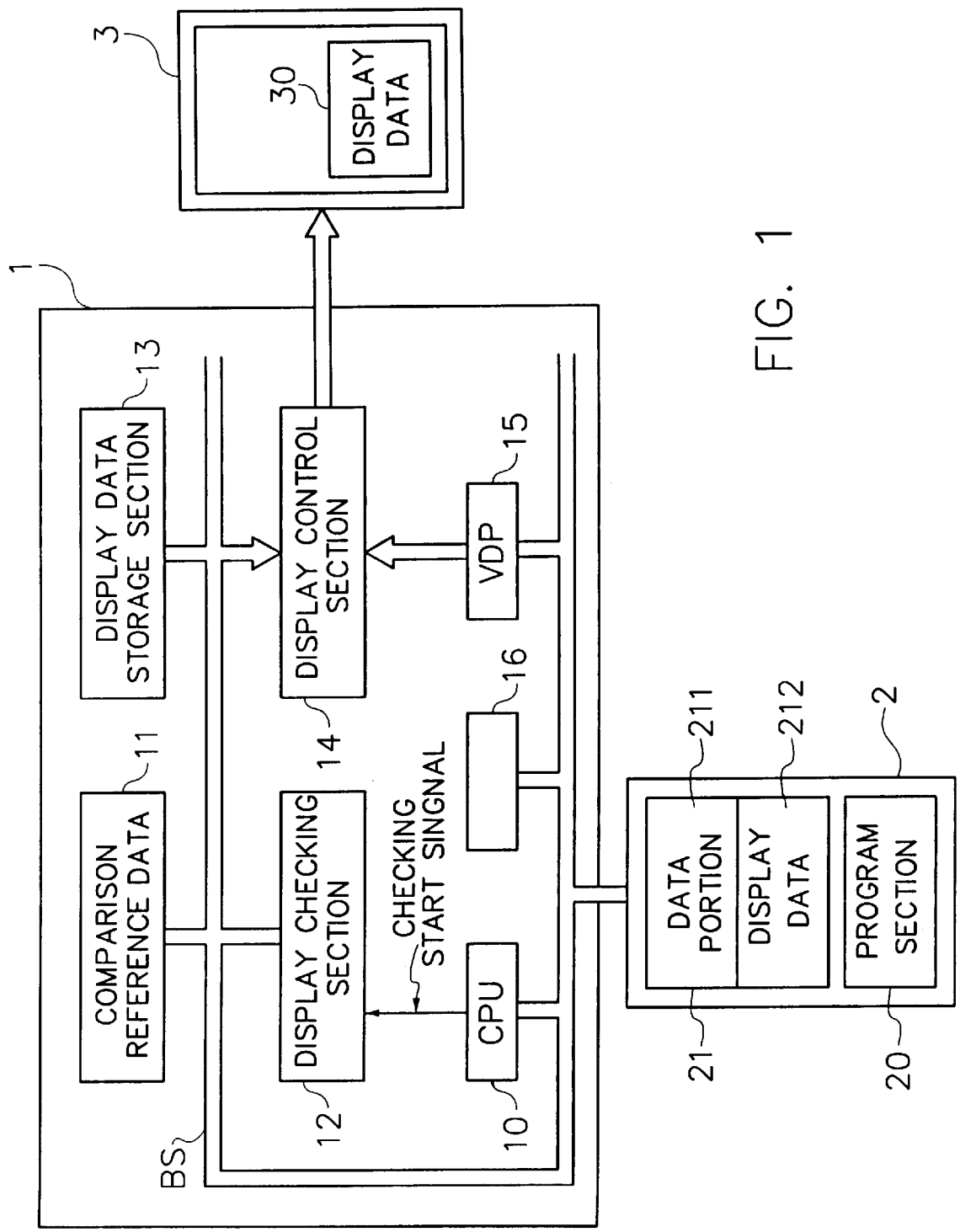
FIG. 1 is a block diagram for one embodiment of the present invention.

FIG. 1 is a block diagram illustrating the arrangement of one embodiment of the present invention in which an information processing apparatus is applied to a game machine. A game machine 1, which serves as an information processing apparatus, has internally a CPU 10, a comparison reference data memory 11, a display check section 12, a display data storage section 13, a display control section 14, a video display processor (VDP) 15, and a work memory 16 that are mutually connected by a bus BS.

A game cartridge 2, which serves as an external memory device, is detachably connected to the game machine 1 by a connector. Inside the game cartridge 2 is mounted a ROM wherein there are a data storage area 21 and a game program storage area 20 for the execution of a game Although in the following explanation a game cartridge 2 and its internally mounted ROM are employed as an external memory device and its memory, they can be replaced by a CD disk drive and a CD-ROM.

The data storage area 21 has a data portion 211 for storing data, such as characters, that are usually displayed during the execution of a game, and a display data portion 212 for storing data that are displayed for security checking according to the present invention.

The display data indicate an authentic program that is used in the game machine 1, as will be described later, and include, for example, data concerning an image, or data for sounds, such as a trademark of a distributor of the game machine 1.

The display data can be compressed and stored, as needed, to provide greater security.

According to the present invention, a game program that is stored in the game program storage area 20 partly includes, at the least, a control command for reading display data from the display data portion 212, and for transferring the data to the display data storage section 13 of the game machine 1 for storage therein.

When the display data are compressed and stored in the display data portion 212 as described above, a decompression program for decompressing the compressed display data may be stored as one part of the game program in the game program storage area 20. When hardware is employed for data decompression, a decompression circuit can be arranged in the game machine 1 or in the game cartridge 2.

A display device 3 in FIG. 1 receives a video signal from the display control section 14 of the game machine 1, and provides a specific display on its display portion. In particular, display data 30, which have been read from the game cartridge 2 and have been transferred to and stored in the display data storage section 13 according to the present invention, are displayed, at a predetermined position of the display device 3.

Although, in the embodiment, data are displayed as an image on the display device 3 for security checking by the present invention, display data for the present invention are not limited to an image.

In other words, as is previously described, not only video data, but also speech data are included as data indicating that an authentic program is being used in the game machine 1. When the display data are speech data, the data are naturally used to produce sounds.

Figure 2:
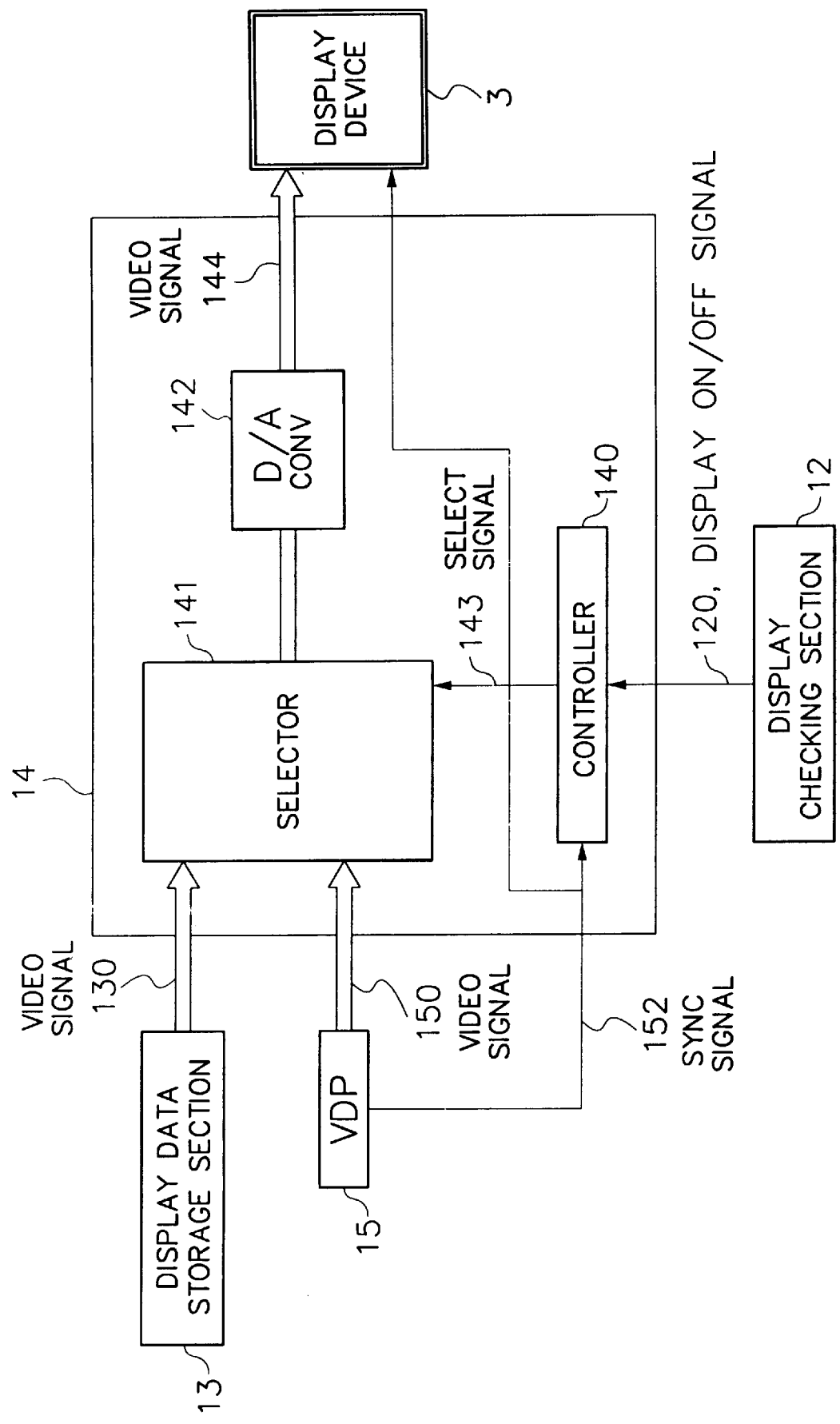
FIG. 2 is a block diagram illustrating an example arrangement for a display controller.

In FIG. 2 are shown the details of the display controller 14 and the arrangement, including the display device 3, for displaying the display data 30 according to the present invention. The display control section 14 includes a controller 140, a selector 141 and a D/A converter 142.

FIGS. 3 through 6 are flowcharts for the operations performed by the CPU 10, the display check section 12 and the controller 140 of the display control section 14. The details in FIGS. 1 and 2 will now be described while referring to the flowcharts.

Figure 3:
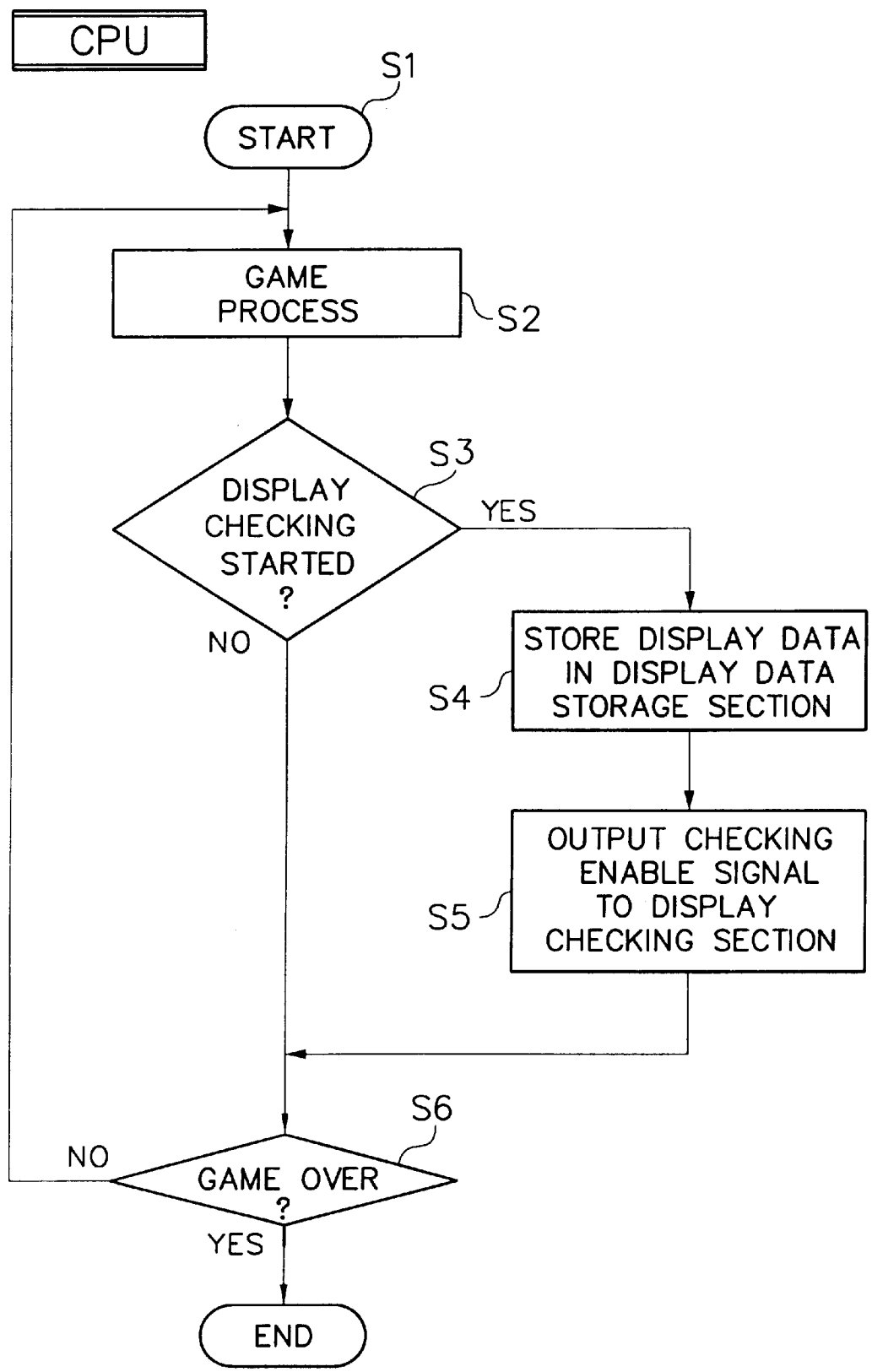
FIG. 3 is a flowchart for the operation of a CPU.

In FIG. 3, when a power switch (not shown) of the game machine 1 is turned on to begin a game (step S1), the CPU 10 reads a game program from the program storage area 20 of the game cartridge 2, and executes the program (step S2).

The game program that is read by the CPU 10 includes a command for instructing the start of display checking at a predetermined timing. Therefore, the CPU 10 makes a search to determine whether or not the display checking start command is present (step S3).

The timing for starting the display checking can be set arbitrarily. For example, the changing of a game scene as the game advances cab be regarded as a time at which to start the display checking. Such a command can be described in the game program.

When there is a display checking start command (step S3: Yes), the CPU 10 executes a storage command described in the read game program (step S4). That is, in consonance with the storage command for the game program, the CPU 10 reads display data from the display storage area 21 of the game cartridge 2, and transfers the data to and stores it in the display data memory 13.

Following this, the CPU 10 outputs a checking enable signal to the display checking section 12 (step S5). The check enable signal includes a check start signal, data type information, data size information, and display position information.

The above operation is repeated by the CPU 10 until the game is over (step S6).

The data type information specifies one of the reference data types that are stored in advance in the comparison reference data memory 11. The data size information designates a display data size for the display data 30 before they are displayed on the display device 3, if a function for varying the size of the display data 30 is included.

The display position information specifies the position for the display data 30 on the display device 3 when a function for varying the display position is included.

Figure 4:
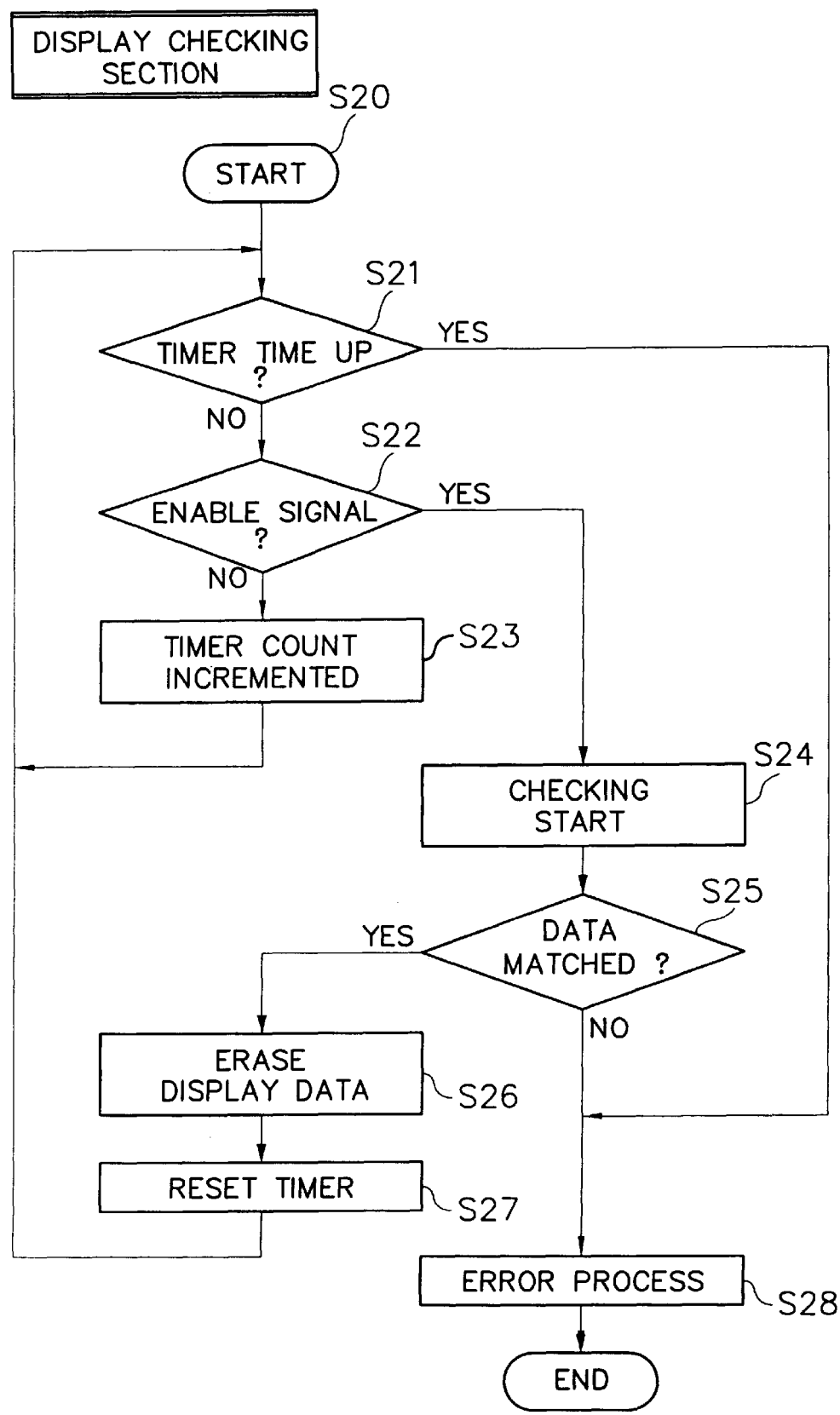
FIG. 4 is a flowchart I for the operation of a display checking section.
Figure 5:
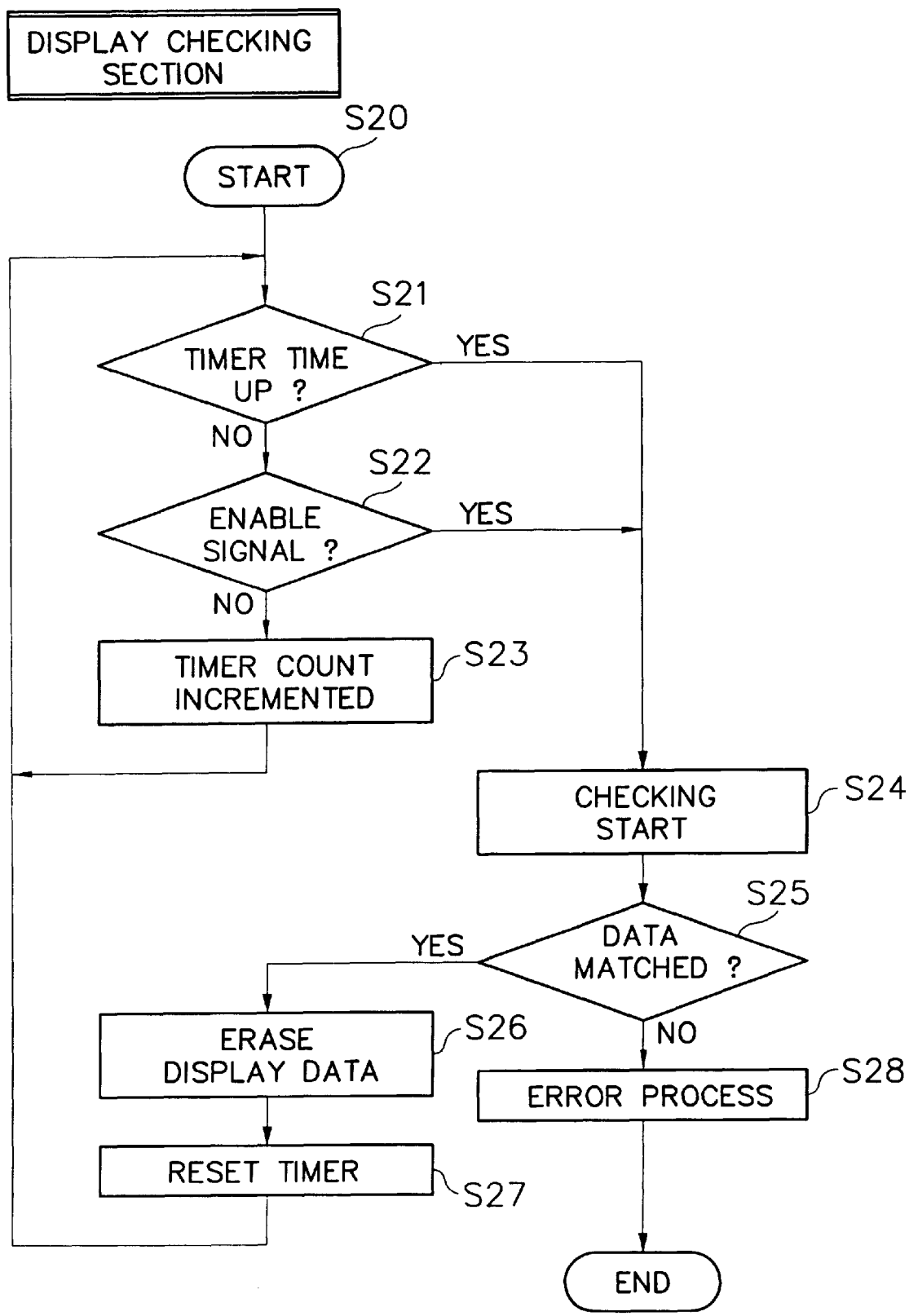
FIG. 5 is a flowchart II for the operation of the display checking section.

FIG. 4 is a first flowchart for the processing by the display checking section 12 following the receipt from the CPU 10 of a checking enable signal that includes a checking start signal, data type information, data size information, and display position information.

The display checking section 12 is essentially constituted by a special logic circuit that has a timer counter and a comparator, or a CPU. When the game machine 1 is powered on, the timer counter starts counting (step S20).

When the display checking section 12 is constituted by a logic circuit, comparison logic is calculated for security checking (data comparison) by using the input of a checking enable signal from the CPU 10 as a trigger. When the display checking section 12 is constituted by a CPU, a data comparison program is stored in the ROM (not shown in FIG. 1) of the game machine 1. With the input of a checking enable signal from the CPU 10 as a trigger, the display checking section 12 executes that data comparison program to perform security checking (data comparison).

Then, since the timer counter serves as a watched-dog timer, a check is performed to determine whether or not the count by the timer counter has reached a predetermined count value, i.e., whether or not a predetermined time period has elapsed (step S21).

When the count by the timer counter has reached the predetermined count value, this means that the CPU 10 could not correctly read a program from the program storage area 20 in the game cartridge 2 within the predetermined time period. Or this means that a program is not authentic and the security for the program can not be legally unlocked because the program does not have a security release routine, or does not have key data (display data) for releasing the security.

This event is processed as an error (step S28). In such a case, performance of the security checking is halted, and the display checking section 12 generates, for example, a halt signal that is forwarded to the CPU 10 as an error signal. In response to this signal, the CPU 10 halts the operation and the execution of the game program is discontinued.

If, at step S21, the count by the timer counter has not yet reached a predetermined count value, a check is performed to determine whether or not an enable signal has been transmitted from the CPU 10 (step S22). When an enable signal has not been transmitted from the CPU 10, the timer counter continues counting (step S23).

When an enable signal has been transmitted from the CPU 10, the security checking is begun (step S24). The security checking is performed as follows according to the present invention.

In FIG. 1, in response to a command that is included in a game program, which is stored in the program storage area 20 in the internally provided ROM in the game cartridge, the CPU 10 reads display data from the display data portion 212 and transfers the data to the display data storage section 13, which is a RAM.

At the same time, in response to a checking start command that is included in the game program, the CPU 10 transmits to the display checking section 12 a checking start signal that includes data type information, data size information, and display position information.

The definitions for the data type, data size, and data position information have been given above. The data must be displayed in the language of a country in which a game machine is used even though security display data have the same meaning.

The data type information, therefore, also includes information that indicates for indicating which data of a plurality of display data that correspond to different languages are stored in the display data portion 212 of the game cartridge 2. Thus, a plurality of different types of comparison reference data are stored in the comparison reference data storage section 11, the ROM, of the game machine 1.

Among the display data that are output from the display checking section 12 to the display control section 14, the data size information and the display position information especially can be varied by an illegal operation, with the data display size being so changed that it can not be discerned or that it can not be displayed within a valid screen, and the display position being moved to a point outside the limits of a valid screen for the display device 3.

It is, therefore, preferable that a limiter be provided to prevent such illegal modifications of the data display size and the display position. By the provision of the limiter, even when data for a display that is smaller in size than a minimum discernible size or that is larger in size than a maximum display screen size is output by the display checking portion 12, the data for display can be altered to provide a display having an appropriate discernible size.

Referring back to the flowchart in FIG. 4, the display checking section 12 reads, from the comparison reference data storage section 11, comparison reference data that is specified in consonance with the data type, which is transmitted from the CPU 10. The display checking section 12 begins to compare the received reference data with the display data that are transferred to and stored in the display data storage section 13 (step S24).

As a result of the comparison, when the reference data does not match the display data that is stored in the display data storage section 13, it is assumed that the program in the game cartridge 2 is unauthorized, and an error process is performed (step S28).

This error process is performed in the same manner as when the timer counter has counted a predetermined value (step S21: Yes), and the operation of the CPU 10 is forcibly halted. Thus, further execution of the game program is prevented.

When, as the result of a comparison, the reference data is found to match the display data, it is assumed that the game cartridge 2 contains an authorized program. Then, the display data that have been transferred from the display data portion 212 of the game cartridge 2 to the display data storage section 13 and stored therein are erased following a predetermined time (step S26).

The display data are erased for the following reason. If the display data are not erased, once the display data are stored in the display data storage section 13, the result of the security checking (data comparison) is always "the data match," no matter how often the security checking is repeated.

Therefore, repeating the security checking throughout the execution of a program according to the present invention would be meaningless, as an unauthorized (false) program could be performed as a result of the execution of an illegal procedure during the operation. For this reason, the erasure of display data is performed, as is described above, to prevent the execution of such an illegal procedure.

It should be noted that the display data is erased only after the lapse of a predetermined time that is long enough to permit an observer to easily confirm by looking at the monitor that the data match. Further, it is preferable that a special circuit be provided in the game machine 1 so that hardware can be employed to forcibly erase the display data so as to more surely avoid loop-holes that permit the illegal alteration of a program.

Here, the erasing of the display data is performed by clearing the display data previously stored in the display data storage section 13, namely overwriting all "0" bits or overwriting a different pattern of bits on the display data.

The timer counter is reset before the display data is erased (step S27). Program control then returns to the beginning of the routine (step S20), at which point the timer counter restarts the count at an initial value.

Therefore, as long as each repetition of the security checking procedure is performed before the time counted by the timer has expired, and as long as the display data matches the reference data, the error process (step S28) is not performed. On the contrary, when a checking enable signal is not transmitted before the time counted by the timer has expired, a program is regarded as an illegal program, and the error process is performed.

As is explained above, in this embodiment, each time a checking enable signal is transmitted from the CPU 10 to the display checking section 12, a repetition of the security checking is performed within a predetermined time.

In the flowchart in FIG. 4, when, at step S21, the count by the timer counter has reached a predetermined value, the error process (step S28) is immediately performed. However, as is shown in the flowchart for another embodiment, even when a timer counter has counted up to a specific value, security checking may be performed (step S24) to determine whether or not display data matches reference data (step S25).

When for an unauthentic game program the timer counter has counted up to the predetermined value, the security checking does not result in the matching of the display data, and an error process (step S28) is performed. The other processes are the same as in the flowchart in FIG. 4 for the previous embodiment.

When as the result of a comparison by the display checking section 12 it is determined that the reference data match the display data, a game program that is stored in the game cartridge 2 is regarded as authentic.

On the other hand, if, for an illegal game program copy, the result of the comparison by the display checking section 12 shows that the two sets of data match, the performance of the game program can therefore be continued.

In this case, however, illegal copying can be inhibited by displaying data on the display device 3, such as the data for a trademark, that can inhibit the use of the program by an unauthorized person.

The fact that data for a trademark is displayed on the display device 3 indicates the apparent infringement by an unauthorized person of the rights accruing to the trademark.

Figure 6:
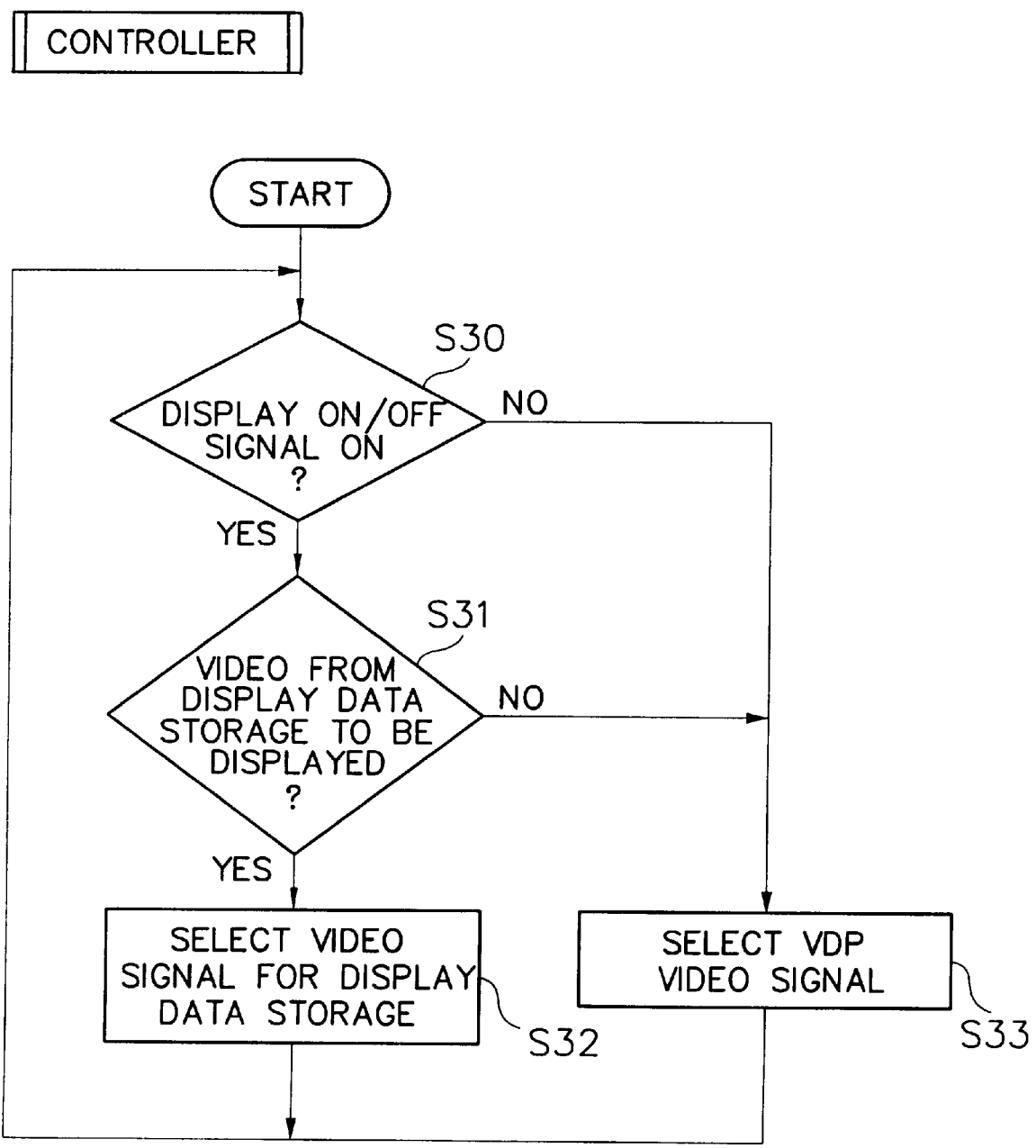
FIG. 6 is a flowchart for the operation of a control section in the display controller.

FIG. 6 is a flowchart for the operation of the controller 140 (see FIG. 2) in the display control section 14. As is previously explained while referring to FIG. 1, when a checking start signal is transmitted from the CPU 10 to the display checking section 12, data type information, data size information, and display position information are also sent.

In response to the checking start signal, the display checking section 12 transmits a display ON/OFF signal, information 120 for a data size, and a display position to the controller 140 of the display control section 14. The display control section 14 receives display data as a video signal 130 from the display data storage section 13.

In addition, the display controller 14 receives game image data as a video signal 150 from the video display processor (VDP) 15. In the display control section 14, the video signal 130, from the display data storage section 13, and the video signal 150, from the video display processor 15, are input to the selector 141.

The detailed arrangement and the operation of the video display processor 15 will not be given as they are not directly related to the present invention. The video display processor 15 in this embodiment is a device with a well known structure that is employed for a current video game machine, and serves as an I/O device for the CPU 10. The video display processor 15 includes a register, a color RAM, and a scroll distance setup RAM, and also has a control block for controlling an externally attached video RAM. With this arrangement, the video display processor 15 synthesizes video image data that are displayed on the display device 3 and outputs the resultant data as a video digital signal 150.

From the video display processor 15, vertical and horizontal sync signals 152 are synchronously output with the output of a video digital signal 150, and are input to the controller 140. In consonance with the display ON/OFF signal from the display checking section 12, the controller 140 outputs a select signal 143 synchronously with the sync signals 152.

The select signal 143 is sent to the selector 141 to switch video signals 130 and 150 and to output them. The switching operation will be explained while referring to the flowchart in FIG. 6.

First, the controller 140 determines whether or not the display ON/OFF signal from the display checking section 12 indicates an ON state. When the display ON/OFF signal indicates an ON state, a check is performed to determine whether or not it is time to display a video signal for the display data from the display data storage section 13 (step S31).

The decision for the display data timing at step S31 is made based on the data size and display position signal 120 for the display data from the display checking section 12, and is further based on the sync signal 152 from the video display processor 15.

When it is time to display the data, the video signal 130 for the display data from the display data storage section 13 is selected in consonance with the select signal 143 (step S32). When it is not time to display the data, the video signal 150 from the video display processor 15 is selected in consonance with the select signal 143 (step S33).

In this manner, in consonance with the select signal 143, the selector 141 outputs to the D/A converter 142 either the video signal 130 or 150 for the display data.

The D/A converter converts the digital video signal 130 or 150 into an analog video signal 144. The analog video signal 144 is transmitted together with the sync signal 152 to the display device 3, where a predetermined display is performed.

At step S32, the timing for displaying display data from the display checking section 12, and the performance of security checking (data comparison) by the display checking section 12 are not necessarily paired. The security checking by the display checking section 12 is performed at comparatively short intervals, and a screen display may be performed after the display checking section 12 has performed the security checking and when nothing is affected by that display.

This operation can be performed in such a manner that, for example, a timing at which the display checking section 12 sends the display ON/OFF signal 120 to the display control section 14, or a timing at which the select signal 143 is output from the controller 140 of the display control section 14, is set in advance so that it conforms to a predetermined control cycle.

Figure 7:
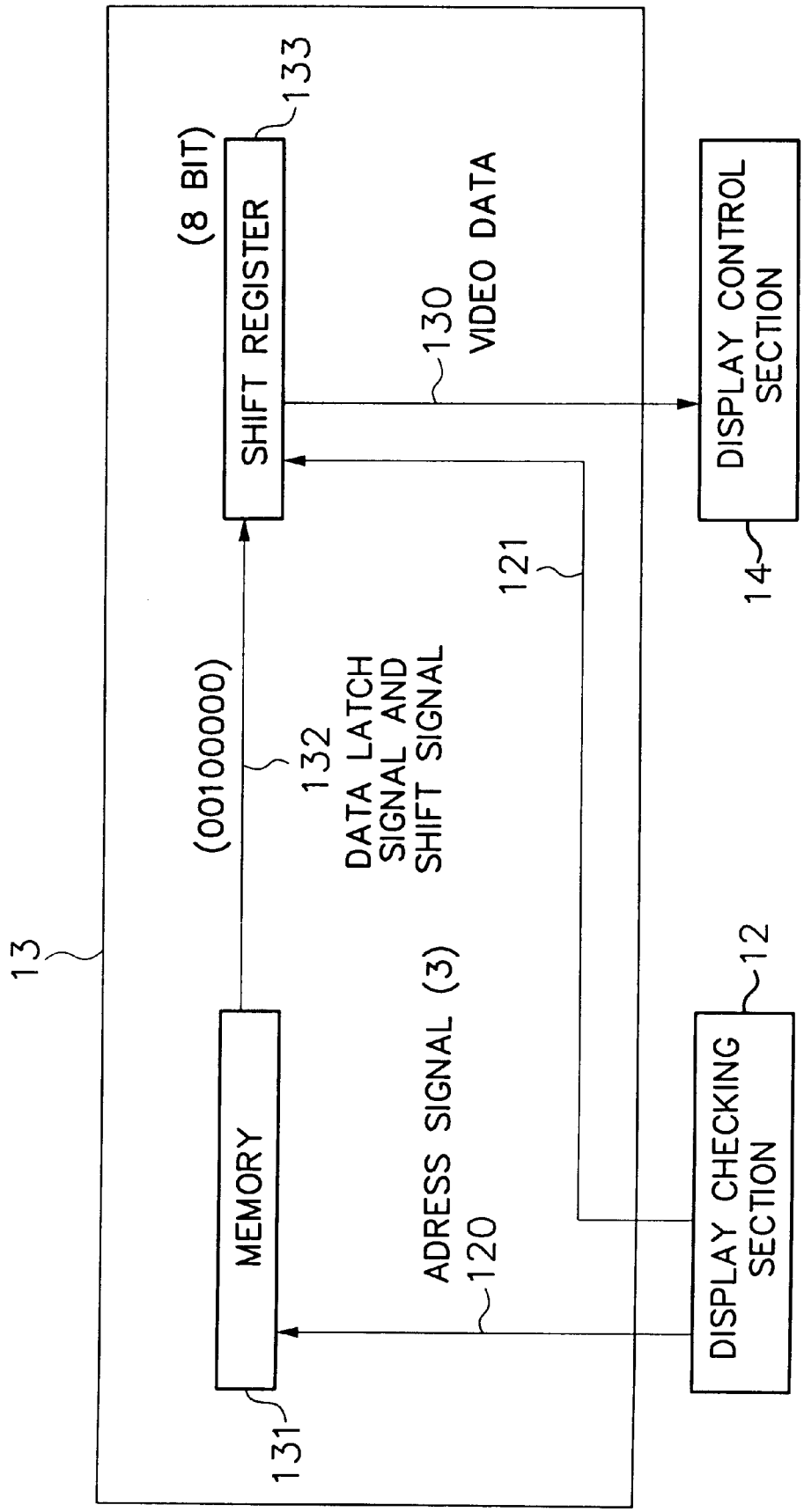
FIG. 7 is a block diagram illustrating an example arrangement for a display data storage section.
Figure 8B:
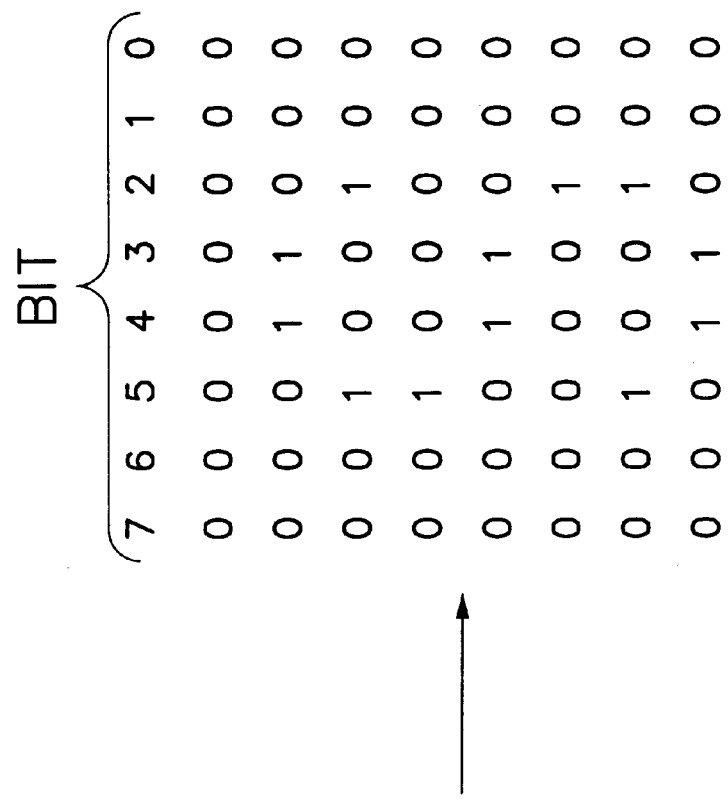
FIGS. 8A and 8B are diagrams for explaining display data, with FIG. 8A showing one example of a display pattern, and with FIG. 8B showing memory bit information that corresponds to the display pattern.
Figure 8A:
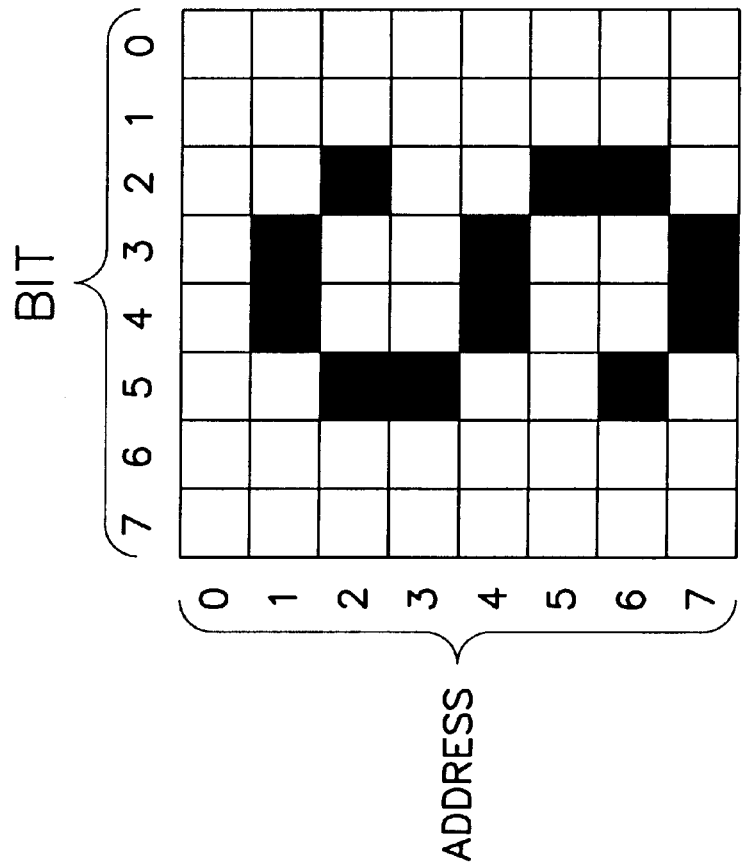
Figure 9:
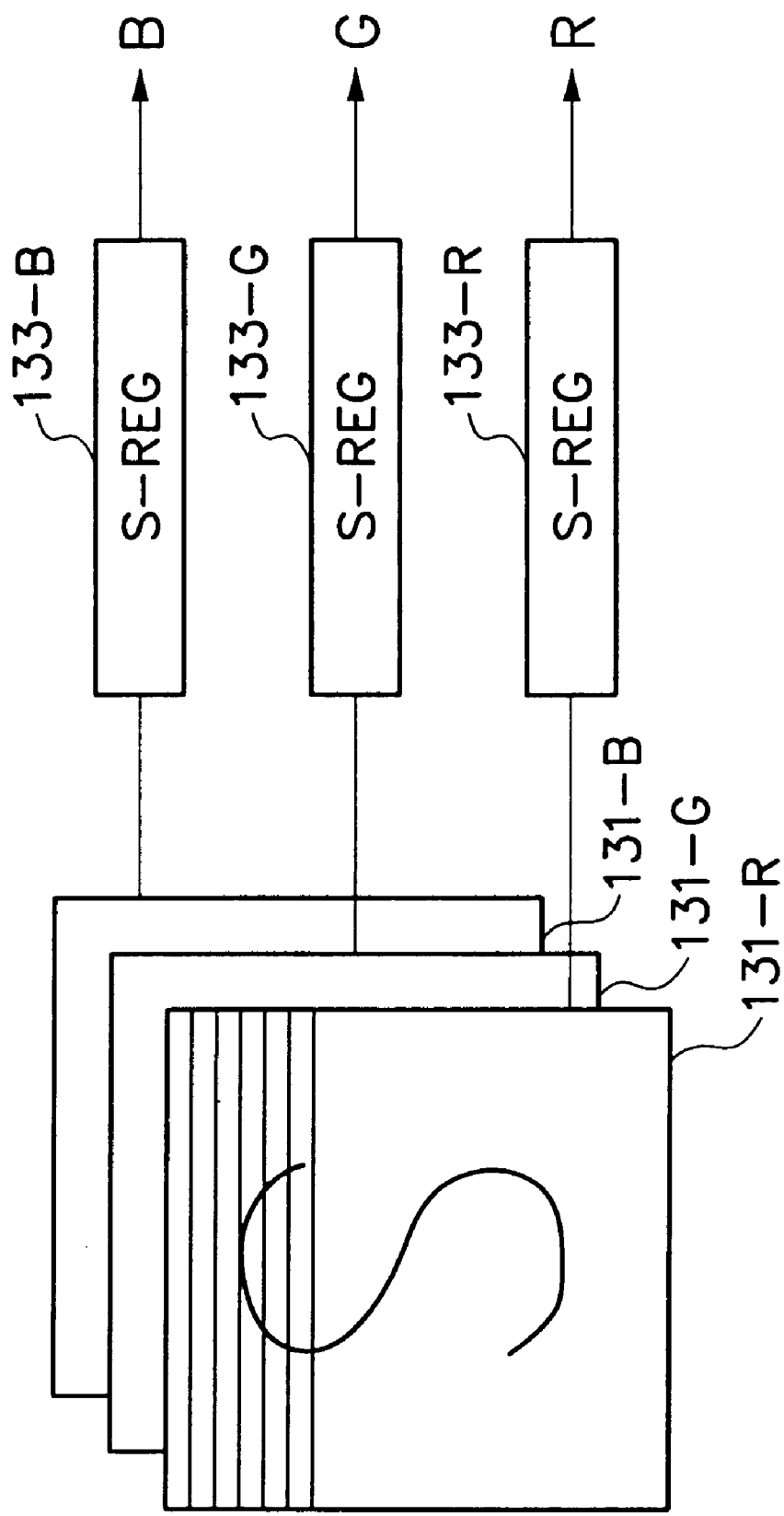
FIG. 9 is a diagram for explaining a method for displaying color display data.

FIGS. 7 through 9 are diagrams for explaining the arrangement of the display data storage section 13, and a method for displaying display data, by using one display data example.

As is shown in FIG. 7, the display data storage section 13 includes a memory 131, a RAM, and a shift register 133. An address signal 120 is sequentially input from the display checking section 12 to the memory 131. Latch signal and shift signal 121 are input from the display checking section 12 to the shift register 133.

Let us consider a case wherein the pattern for the display data is an "S" as is shown in FIG. 8A. A display data area in FIG. 8A is a region encompassing an 8×8 matrix that is composed of 64 pixels, whose locations are specified by employing bits 7 through 0 and addresses 0 through 7.

In the 8×8 matrix region, display data pattern "S" is represented by black dots. In consonance with this display pattern, the bit information in the memory 131 is represented as is shown in FIG. 8B. In other words, the bit positions in the memory 131 that correspond to the black dots that form the display data pattern "S" are set to "1."

Referring back to FIG. 7, when an address signal (3) is input as the address signal 120 from the display checking section 12 to the memory 131, bit information at a corresponding address in the memory 131, i.e., "00100000," is read as data 132.

The data 132 is latched in the shift register 133 by the latch signal from the display checking section 12. In consonance with the shift signal from the display checking section 12, the latched data 132 are transmitted as a video signal 130 to the display control section 14, bit by bit beginning with bit seven (see 121 in FIG. 7).

The video signal 130, which is relayed via the selector 141, is displayed on the display device 3 as the display data 30, as is previously described.

FIG. 9 is a diagram for explaining the structure of the memory 131 for the display data storage section 13 and the shift register 133 when color data are displayed. A specific color is displayed for each bit of display data in the R:G:B combination.

The bit information in FIG. 8B is prepared as a set of three memories, 131-R, 131-G and 131-B, for the R:G:B combination. In addition, the shift registers 133-R, 133-G and 133-B are prepared that correspond to the memories 131-R, 131-g and 131-B.

In order for each R:G:B combination to represent a specific color, a "1" is set in the positions that correspond to the predetermined addresses and bits for the memories 131-R, 131-G and 131-B. Bit information are read from the memories 131-R, 131-G and 131-B and are latched in the shift registers 133-R, 133-G and 133-B, respectively.

The bit information for R:G:B that is latched in the shift registers 133-R, 133-G and 133-B is transmitted as color video information to the display control section 14, as is described while referring to FIG. 7.

The display control section 14 transmits the color video information to the display device in the same manner as is explained while referring to FIG. 2, and the data are then displayed in color on the display device 3.

In the above embodiments, an error signal that the display checking section 12 generates during the error process can be other than the above described halt signal, and may be either a reset signal for the CPU 10, or a system reset signal for the entire game machine 1.

When the display checking section 12 outputs such a reset signal as an error signal, however, it is preferable that the error signal output be continuous in order to prevent re-execution of a counterfeit program after the system is reset.

Figure 10:
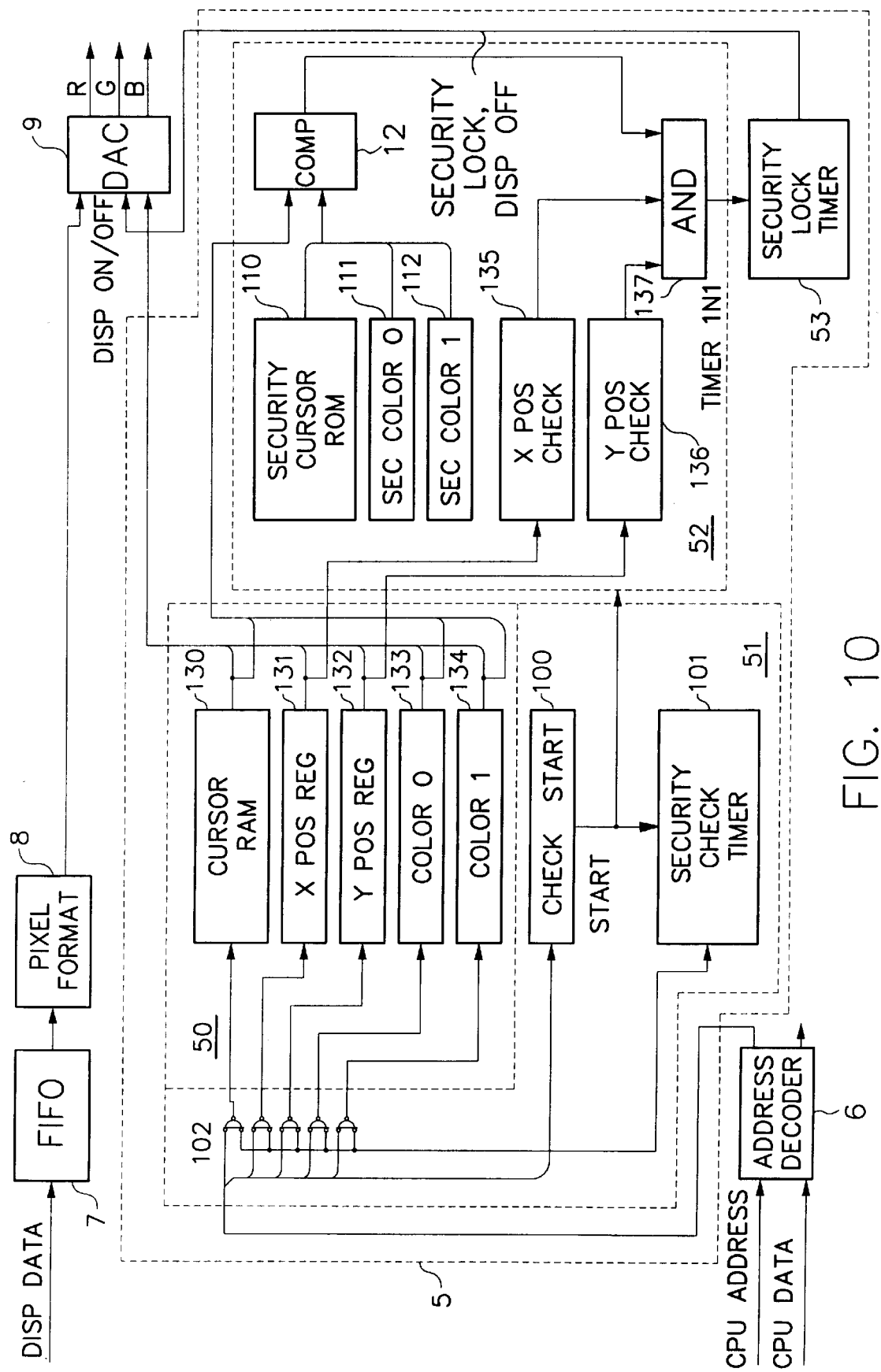
FIG. 10 is a block diagram illustrating a video signal control circuit of another example of the present invention.

As explained above, the display data are displayed, when the display data such as a trademark coincide with the comparison reference data. Contrarily, an embodiment shown in FIG. 10 is a video signal control device which controls to display the display data read out from the cartridge 2, no matter if the display data are authentic or not, for a predetermined period after the comparison of the display data read from the cartridge 2 with the comparison reference data is started. Therefore, it becomes easier for an observer to recognize whether or not the display data is actually displayed for the predetermined period. The video display control device shown in FIG. 10 can be formed on a semiconductor chip, and includes a video signal control circuit surrounded by a thick broken line 5, an address decoder 6, a FIFO memory 7 to which display data sent from the VDP 15 (see FIG. 1) are inputted, a pixel format conversion circuit 8 and a digital analog converter 9.

Further, the video signal control circuit 5 includes a data display circuit 50, security check start control circuit 51, a data comparator 52 and a security lock timer 53.

The circuits, such as the CPU 10, the work memory 16 and the VDP 15 shown in FIG. 1, which are connected to the video signal control device to form a console of a video game system, are not shown in FIG. 10 for simplifying explanation. The operation in the embodiment of FIG. 10 is fundamentally the same as that of FIG. 1, but has some features in operation. The features in the embodiment of FIG. 10 will now be explained as follows, referring to FIG. 1, if needed.

The digital analog convertor 9 corresponds to the D/A convertor 142 of the display control section 14 (see FIGS. 1, 2), and has a fundamental function of converting a digital video signal to an analog video signal, and sends a RGB signal corresponding to the analog video signal to the display device 3.

The digital analog convertor 9 of FIG. 10 receives a digital video signal sent from the VDP 15 via the FIFO memory 7 and the pixel format convertor 8, and an output signal of the data display circuit 50 which is explained later, to convert the signals to analog signals as explained above.

Figure 11:
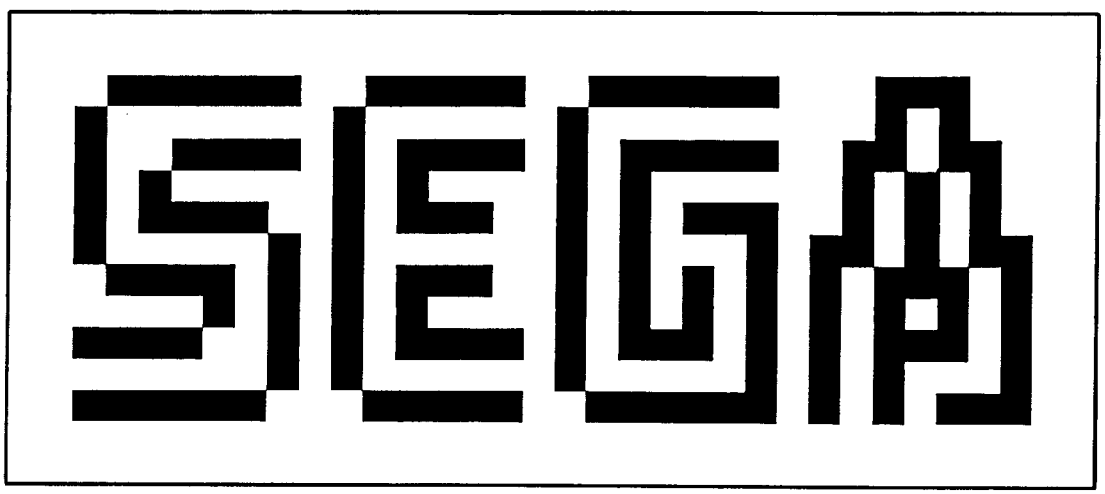
FIG. 11 is a diagram illustrating a logo example for security check, controlled by the video signal control circuit of FIG. 10.

In FIG. 10, a security cursor storage ROM 110 corresponds to the read-only memory 11, as explained in FIG. 1, in which comparison reference data are stored. A logo that is displayed as a security cursor is "SEGA," represented as a simple color in a 32×16 pixel grid, as is shown in FIG. 11 as one example.

Color registers 111 and 112 are registers in which is stored information for designating colors of "1" and "0" for each of pixels that constitute the security cursor.

For example, pixel "1" is displayed in blue on a black background and pixel "0" is displayed in the same color as the black background. Codes that specify these colors are stored in the color registers 111 and 112 in a number that is equivalent to the number of pixels that constitute the security cursor. The color registers 111 and 112 are constituted by a read-only memory, as is the security cursor storage ROM 110. The security cursor and information for colors of corresponding pixels are stored in advance in the security cursor storage ROM 110 and the color registers 111 and 112.

An address decoder 6 decodes an address signal that is received from the CPU 10, and transmits, to a destination circuit in a video signal controller, an enable signal to activate the circuit.

When the CPU 10 has detected a display checking command, which is included in a game program that is stored in the program storage section 20 of the ROM in the game cartridge 2, the CPU 10 transmits to the video signal controller a CPU address for designating the memories, which will be described, of a data display circuit 50, and display data, which have been read from the game cartridge 2, as CPU data.

In the video signal controller of FIG. 10, the data display circuit 50 corresponds to the display data storage section 13 in FIG. 1. The data display circuit 50 has a cursor RAM 130, in which are stored bit map patterns for the security cursor that are included in display data that are sent from the CPU 10. The display data that are received from the CPU 10 also include the display position for the security cursor and display color information. Therefore, the data display circuit 50 further includes an X position register 131, a Y position register 132, and the color registers 133 and 134, in which the above described information is stored.

The address decoder 6 receives, from the CPU 10, a CPU address for designating the display data storage section 13, i.e., the data display circuit 50. The address decoder 6 decodes the CPU address, and outputs an enable signal as a trigger signal to activate the cursor RAM 130, the X and Y position registers 131 and 132, and the color registers 133 and 134.

The enable signal is sent via five OR gates 102 to the cursor RAM 130, the X and Y position registers 131 and 132, and the color registers 133 and 134.

Therefore, the display pattern for the security cursor, its display position information, and the display color information of the display data, which are the CPU data, can be stored, respectively, in the cursor RAM 130, the X and Y position registers 131 and 132, and the color registers 133 and 134.

Following this, the display data that are stored in the cursor RAM 130, the X and Y position registers 131 and 132, and the color registers 133 and 134 are transmitted to a digital analog converter 9.

The logo of the security cursor, which is constituted by bit map data that are stored in the cursor RAM 130, is converted into an analog video signal, so that the individual pixels of the logo are represented by the colors corresponding to the color codes that are stored in the color registers 133 and 134, and are displayed at the display positions that are designated by the data stored in the X and Y position registers 131 and 132.

Bits of the bit map, which constitutes the security cursor in the cursor RAM 130, are displayed in colors, which correspond to the color codes stored in the color registers 133 and 134, in the following manner. When the logical value of a bit of the security cursor is "0," the output of the color register 133 is selected. When the logical vale of a bit is "1," the output of the color register 134 is selected. The output signal is converted into an RGB signal that corresponds to a color code that is designated by the selected color register.

When the display data have been stored in the cursor RAM 130, the X and Y position registers 131 and 132, the color registers 133 and 134, and, when the display of the security cursor is begun in the above described manner, the CPU 10 transmits a CPU address signal for selecting a checking start driver 100 to the address decoder 6. The checking start driver 100 is thus selected and outputs a checking start signal.

Sequentially, in response to the checking start signal, a security checking timer 101 begins counting. The security checking timer 101 outputs a logical value for inhibiting the writing by the CPU 10, via the OR circuit 102, of new data to the individual circuits until the counts by the security checking timer 101 reaches a predetermined value. Therefore, by outputting the same display data from the data display circuit 50, the same security cursor is continuously displayed until the security checking timer 101 reaches the predetermined value.

When the counting by the security checking timer 101 has been completed (when the time has expired), the inhibition of the writing of new CPU data is removed.

Namely, the security check timer 101 starts counting and outputs an inhibiting signal to AND gates 102, so that writing to the cursor RAM 130 is inhibited for a predetermined period, for example one second.

The display data stored in the cursor RAM 130 is continuously displayed for the predetermined period, and therefore, a display data can be written in the cursor RAM 130 only during the checking period and rewriting of display data is inhibited before an observer can recognize the displayed display data.

Consequently, even a logo such as a trademark included in an illegal program is displayed for the predetermined period when the security checking is started, so that the display of the trademark would constitute infringement on the trademark right or violation of the unfair competition law.

A checking start signal from the checking start driver 100 is transmitted as a trigger signal to the individual circuits in a data comparator 52. Upon the receipt of the trigger signal, a comparison circuit 12 reads the display data, which are stored in the cursor RAM 130, and in the color registers 133 and 134 in the data display circuit 50, and comparison reference security data that are stored in a security cursor RAM 110, and in security color registers 111 and 112 in the data comparator 52, and compares these data. When the data match, the comparison circuit 12 outputs a logical value of "1," and when the data do not match, it outputs a logical value of "0."

The data comparator 52 also includes an X position checking circuit 135 and a Y position checking circuit 136. These circuits 135 and 136 respectively read X coordinate data and Y coordinate data for a security cursor display start position from the X position register 131 and the Y position register 132 in the data display circuit 50. The circuits 135 and 136 compare these position data with permissible display ranges that are set in advance, i.e., with an X position range and a Y position range, respectively.

When the X coordinate and Y coordinate position data are within the permissible display ranges, the X position checking circuit 135 and the Y position checking circuit 136 output a logical value "1." When the X and Y coordinate data are not within the permissible ranges, a logical value "0" is output.

An AND circuit 137 receives the outputs of the comparison circuit 12, the X position checking circuit 135, and the Y position checking circuit 136. When all of these logical values are "1," it is assumed that an authentic program 20 is packaged in the cartridge 2.

Then, the AND circuit 137 outputs a timer reset signal and the count value for a security lock timer 53 is reset to an initial value, for example, "0" to begin a new counting sequence. Through this process, a time duration until the count by the security lock timer 53 has reached a predetermined value is extended.

As understood above, the security lock timer 53 is provided to execute repeatedly a security checking during the operation of a game program, differently from the security check timer 101 which is provided to display a security cursor for a predetermined period. The security lock timer 53 is made active, or state of counting, as far as an authentic program is executed because it is necessarily reset to an initial value.

The authentic program has to be designed to start security checking before the security lock timer 53 completes counting or the predetermined period has been expired. As an example, the predetermined period, that is, the period until the security lock timer 53 completes counting is set about 15 minutes.

If the result of comparison is that a display data does not coincide with the comparison reference data, the AND gate 137 outputs a display OFF signal to the digital analog convertor 9, as the security lock timer 53 is not reset. This makes it disable to display any data on the display device 3, as explained as follows.

Further, in such a case that an illegal program could not write an authentic display data into the cursor RAM 130, the security lock timer 53 is not reset, and therefore, the security lock timer 53 becomes time-up or reaches a certain count value to output the display OFF signal and then any display of display data is inhibited.

The output of the cursor RAM 130 in the data display circuit 50 is set in advance as bit map data having higher priority than display data that are output by the VDP 15 (see FIG. 1). In the period before the count by the security lock timer 53 has reached a predetermined value, data for a logo, for example, the logo shown in FIG. 11, that are stored in the cursor RAM 130 for displaying the security cursor, is displayed in the colors that are specified by the color registers 133 and 134, and at a position that is designated by the X and Y position registers 131 and 132.

When either input to the AND circuit 137 is "0," it is assumed that the program 20 packaged in the cartridge 2 is counterfeit.

In such a case, a reset signal is not output from the AND circuit 137, and the security lock timer 53 continues counting. When the count value reaches a predetermined value, a display OFF signal is output by the security lock timer 53.

The display OFF signal is sent to the digital analog converter 9, so that a video signal, which is transmitted from the VDP 15 to the digital analog converter 9 via an FIFO memory 7 and a pixel format 8, is prevented from being converted into an analog video signal.

As is described above, when it is assumed through the security checking that the program 20 packaged in the cartridge 2 is counterfeit, the display of a video data signal from the VDP 15 is inhibited, and the execution of the game is discontinued.

In the embodiment in FIG. 10, the function of the data comparator 52 can be integrally provided as one part of the digital analog converter 9. In this case, immediately before data are converted into an analog video signal, i.e., immediately before data are output to the display device 3, the data can be examined, so that it is extremely difficult to bypass the security checking process, or to decode display data after they have been subjected to security checking processing.

As is described above in the embodiments, according to the present invention, display data that are stored in the game cartridge 2 are transmitted to the game machine 1, and in consonance with a game program that is stored in the game cartridge 2, the display data are displayed on the display device 3, which is connected to the game machine 1.

Thus, the authenticity of a game cartridge 2 and of a game program can be easily confirmed by the presence on the display of the display data and the data contents that are displayed.

At the same time, according to the present invention, the game machine 1 repeatedly compares display data that are stored in the game cartridge 2 with reference data during the execution of the game program (during the operation of the game). Even when the security checking process is altered for the purpose of bypassing it, the authenticity of the game program can be easily determined.

When a game program is not authentic, the operation of the CPU 10 of the game machine 1 is forcibly halted to prevent the further execution of the unauthentic game program. In this manner, the use of an illegally copied program can be prevented.

Although a game machine has been employed as an example in the above embodiments, the present invention is not limited to these embodiments, and can be applied to any common information processing apparatus having an external storage device and a display device.

In addition, an equivalent system that is employed for the same purpose and provides the same effect as the present invention falls within the scope of the present invention.

What is claimed is:

1. An information processing apparatus having a security checking function, comprising:
    an external memory device for storing a program and display data;
    an information processing console to which said external memory device is detachably connected, including,
    a CPU for executing the program that is read out from said external memory device,
    an internal memory device for storing comparison reference data, and
    a security, checking device for comparing said comparison reference data with said display data read out from said external memory device in response to a checking start signal, said checking start signal being based on a display checking start command included in said program read out from said external memory device; and
    a display device for displaying the display data that are read out from said external memory device if said display data read out from said external memory device matches said comparison reference data,
    wherein said security checking device repeatedly compares said display data with said comparison reference data as the CPU executes said program readout from said external memory.

2. The information processing apparatus according to claim 1,
    wherein the fact that said display data are displayed on said display device means infringement by an unauthorized person of a legal right accruing to the display data.

3. The information processing apparatus according to claim 1 or 2,
    wherein said information processing console further includes a display data storage device for storing the display data that are compared with said comparison reference data, and said CPU transfers and stores said display data from said external memory device to said display data storage device in accordance with the program that is stored in said external memory device.

4. The information processing apparatus according to claim 3,
    wherein said display data are transferred from said external memory device to and are stored in said display data storage device before said security checking device performs data comparison, and after said data comparison by said security checking device and the display of said display data by said display device are completed, said display data are erased from said display data storage device.

5. The information processing apparatus according to claim 1, wherein said display data are read out from said external memory device only once when said CPU executes said program.

6. The information processing apparatus according to claim 1, wherein said display data are read out from said external memory device repeatedly as said CPU executes said program.

7. The information processing apparatus according to claim 1, wherein said display data are displayed on said display device only once when said CPU executes said program.

8. A security checking method for checking authenticity of a program in an information processing apparatus, comprising:

a first step of reading a program and display data out from an external memory device in which said program and said display data are stored;

a second step of outputting a checking start signal based on a display checking start command included in said program read out from said external memory device;

a third step of comparing said display data read out from said external memory device with comparison reference data when a checking start signal is output, and generating an error signal when said display data do not match said comparison reference data; and a fourth step of, in response to said error signal, preventing execution of at least one part of said program, wherein comparison of said display data with said comparison reference data at said third step is repeatedly performed during the execution of said program.

9. The security checking method according to claim 6, further comprising a fifth step of, when said display data match said comparison reference data at said third step, generating a control signal for displaying said display data, and displaying said display data based on said control signal.

10. The security checking method according to claim 6 or 9, wherein said display data that are stored in said external memory device are read in at said first step in consonance with said program.

11. The security checking method according to claim 10, further comprising a sixth step of, after said display data are displayed at said fifth step, erasing said display data that have been read in.

12. A video signal control device for controlling the display of a first video signal and a second video signal which has a priority of displaying to the first video signal comprising:

a read-only memory for storing a reference display data which is compared with a display data of said second video signal;

a comparing circuit for comparing the reference display data with said display data of the second video signal;

a control circuit for inhibiting the display of said first video signal after a predetermined time has elapsed, when said comparing circuit detects that the reference display data does not coincide with the display data of the second video signal; and a timing circuit for controlling the period of displaying said second video signal, during which an observer can recognize the display data of the second video signal, wherein said display data of the second video signal includes a security cursor constituted by a bit map pattern and a display position at which the security cursor is displayed, said comparing circuit compares the display position of the second video signal with a reference display position data which is included in said reference display signal, and said control circuit inhibits the display of the first video signal when the display position of the security cursor is not present within an allowable display area which is defined by the reference display position.

13. The video signal control device according to claim 12, wherein said bit map pattern is stored in said read only memory, with a fixed largeness so that an observer can recognize the second display data.

14. The video signal control device according to claim 12, wherein said security cursor constituted by the bit map pattern is a specific logo mark.

15. An information processing apparatus having a security checking function, comprising:

an external memory device for storing a program and display data;

an information processing console to which said external memory device is detachably connected, including, a CPU for executing the program that is read out from said external memory device, an internal memory device for storing comparison reference data, and a security checking device for comparing said comparison reference data with said display data read out from said external memory device in response to a checking start signal, said checking start signal being based on a display checking start command included in said program read out from said external memory device; and a display device on which the CPU displays said display data in accordance with the program stored in said external memory device if said display data read out from said external memory device matches said comparison reference data, wherein said security checking device repeatedly compares said display data with said comparison reference data during the execution of the program by said CPU.

16. The information processing apparatus according to claim 15, wherein said display data displayed on said display device depicts a representation of a legal right which is associated with an external memory device authorized for use with said information processing console.

17. The information processing apparatus according to claim 15, wherein said information processing console further includes a display data storage device for storing the display data that are compared with said comparison reference data, and said CPU transfers and stores said display data from said external memory device to said display data storage device in accordance with the program that is stored in said external memory device.

18. The information processing apparatus according to claim 15, wherein said display data are read out from said external memory device only once when said CPU executes said program.

19. The information processing apparatus according to claim 15, wherein said display data are read out from said external memory device repeatedly as said CPU executes said program.

20. The information processing apparatus according to claim 15, wherein said display data are displayed on said display device only once when said CPU executes said program.

21. An information processing console having a security checking function, comprising:

a CPU for executing a program received externally of said console;

an internal memory device for storing comparison reference data; and a security checking and display control device for repeatedly comparing comparison reference data with display data received externally of said console in response to a checking start signal, said checking start signal being based on a display checking start command included in said externally received program, as the CPU executes said externally received program, and controlling the display of said externally received display data on a display device.

22. The information processing console according to claim 21, wherein said display data displayed on said display device depicts a representation of a legal right which is associated with said externally received program which is authorized for use with said information processing console.

23. The information processing console according to claim 21, wherein said information processing console further includes a display data storage device for storing the display data that are compared with said comparison reference data, and said CPU stores said externally received display data to said display data storage device in accordance with said externally received program.

24. The information processing console according to claim 23, wherein said display data are stored in said display data storage device before said security checking device performs said data comparison, and after said data comparison by said security checking device and the display of said display data by said display device are completed, said display data are erased from said display data storage device.

25. The information processing console according to claim 21, wherein said display data are externally received only once when said CPU executes said program.

26. The information processing console according to claim 21, wherein said display data are externally received repeatedly as said CPU executes said program.

27. The information processing console according to claim 21, wherein said display data are displayed on said display device only once when said CPU executes said program.

28. The information processing console according to claim 21, wherein said display data are externally received from an external memory device.

29. The information processing console according to claim 21, wherein said program is externally received from an external memory device.

30. An information processing console having a security checking function, comprising:

a CPU for executing a program received externally of said console;

an internal memory device for storing comparison reference data; and a security checking and display control device for repeatedly comparing comparison reference data with display data received externally of said console in response to a checking start signals, said checking signal being based on a display checking start command included in said externally received program, and controlling the display of said externally received display data on a display device in accordance with said externally received program during the execution of the program by said CPU.

31. The information processing console according to claim 30, wherein said display data displayed on said display device depicts a representation of a legal right which is associated with said externally received program which is authorized for use with said information processing console.

32. The information processing console according to claim 30, wherein said information processing console further includes a display data storage device for storing the display data that are compared with said comparison reference data, and said CPU stores said externally received display data to said display data storage device in accordance with said externally received program.

33. The information processing console according to claim 30, wherein said display data are externally received only once when said CPU executes said program.

34. The information processing console according to claim 30, wherein said display data are externally received repeatedly as said CPU executes said program.

35. The information processing console according to claim 30, wherein said display data are displayed on said display device only once when said CPU executes said program.

36. The information processing console according to claim 30, wherein said display data are externally received from an external memory device.

37. The information processing console according to claim 30, wherein said program is externally received from an external memory device.

* * * * *